Jan. 10, 1950

K. D. SWARTZEL ET AL 2,494,370

MULTICHANNEL TELEMETERING SYSTEM WITH
IDENTICAL BAND PASS FILTERS

Filed Feb. 8, 1945

INVENTOR.
KARL D. SWARTZEL
CARL L. FREDERICK
BY George F. Goodyear
ATTORNEY

Jan. 10, 1950

K. D. SWARTZEL ET AL
MULTICHANNEL TELEMETERING SYSTEM WITH
IDENTICAL BAND PASS FILTERS 2,494,370

Filed Feb. 8, 1945

*INVENTOR.*
KARL D. SWARTZEL
CARL L. FREDERICK
BY George F. Goodyear
*ATTORNEY*

Patented Jan. 10, 1950

2,494,370

UNITED STATES PATENT OFFICE 2,494,370

MULTICHANNEL TELEMETERING SYSTEM WITH IDENTICAL BAND-PASS FILTERS

Karl D. Swartzel, Eggertsville and Carl L. Frederick, Williamsville, N. Y., assignors to Curtiss-Wright Corporation, a corporation of Delaware Application February 8, 1945, Serial No. 576,862

8 Claims. (Cl. 177—351)

1

This invention relates to the automatic transmission of measurement data by means of radio waves, conveniently known as radio telemetering, and the reception of such data and waves at a distance from the source of such data. It is particularly applicable for measuring in flight and automatically receiving on the ground information concerning the flight of an airplane, especially information concerning structural strains taking place in the airplane during such flight.

In the flight testing of modern aircraft, particularly military and naval aircraft of new types, it is often desirable to secure and accurately record information as to the structural strains occurring during flight under various conditions of altitude, temperature, speed and acceleration. Many of the strains which occur under such conditions vary at a frequency which may be as high or higher than 100 cycles per second. With such information, it is extremely desirable to know, not only the magnitude of such strains but also the frequency. As it is impossible to visually observe phenomenon which vary at this frequency, it is necessary to alter and/or record the phenomenon so that the results may be visually observed. Equipment necessary for this purpose requires the use of electronic tubes and circuits which are often quite heavy and bulky. Inasmuch as the question of weight is quite an important factor in the construction and operation of modern aircraft, it is readily seen that it is desirable to have as little as possible of this equipment installed in the airplane itself. This can be accomplished by transmitting the information from the airplane during flight by means of radio transmitting equipment installed in the airplane and receiving and recording this information on the ground. In addition to the advantage of the saving in weight, this arrangement has a very important advantage in that the flight information is preserved even in case the airplane is lost through structural failure or otherwise. This is particularly important in the case of new or experimental airplanes of unknown characteristics which are often put through limiting stresses in order to observe how much strain the airplane can take.

It is therefore an object of this invention to provide means for collecting data which may vary at a frequency up to 100 or more cycles per second in an airplane while in flight, transmitting such data from the airplane by means of radio waves and receiving and/or recording such data on the ground. It is another object to provide such an arrangement which will simultaneously trans-

2 mit data collected from a number of different points of the airplane structure over a single radio channel of a single carrier frequency and to receive such signal and separate it into its component parts. It is another object to provide such transmitting equipment which will be able to operate over a wide range of altitude, temperature and pressure conditions and at the same time withstand any acceleration or other strains to which the airplane itself is subject. It is a still further object to provide such an arrangement which will permit the transmission and reception of measurement data varying at a frequency of up to 250 cycles per second with accurate fidelity as to time and amplitude. Other objects will appear hereinafter.

These objects are accomplished by means of the herein described invention which may be more readily understood by reference to the accompanying drawings in which.

Figure 1:
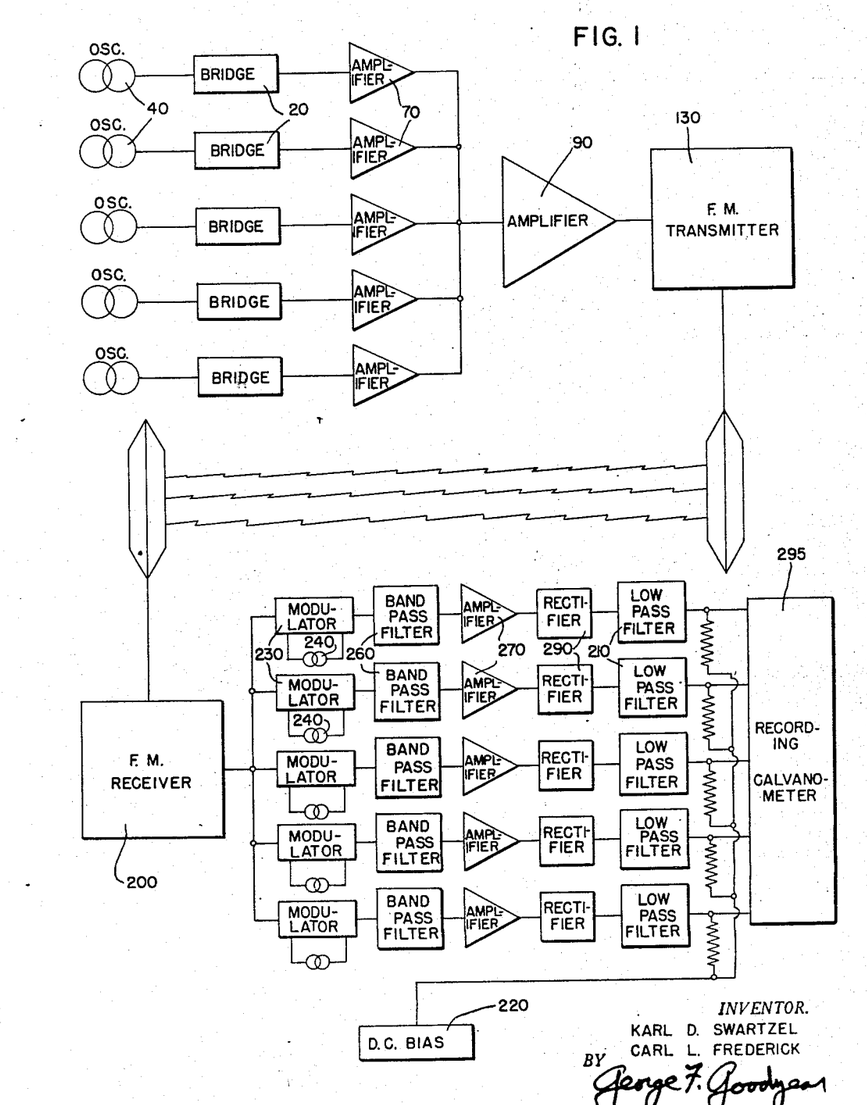
Figure 1 is a general schematic view of the entire system.

Figure 1 illustrates the general scheme of both transmitting and receiving ends of the apparatus. It consists generally of a plurality of measuring circuits 20, each consisting of a Wheatstone bridge in which a primary measuring element is incorporated as one arm thereof. For convenience in illustration, five such measuring circuits are shown in the form illustrated in Figure 1, so that five separate sets of data from five separate structural parts of the airplane can be obtained. In actual practice it is preferred to employ a considerably greater number of measuring circuits. The input of these five measuring circuits is obtained by means of five oscillators indicated generally at 40. Each of these five oscillators is designed to generate a signal of a different frequency from that of any of the remaining oscillators. For convenience, however, the five frequencies will be located as close together as it is possible to do without mutual interference. The extent of interference, of course, will depend upon the side-band frequency imposed upon the oscillator frequency by the data being measured. A frequency difference of 2500 cycles per second between adjacent oscillators has been found suitable, and in this case the equipment is suitable for accurately reproducing data which varies at a frequency as high as 250 cycles per second. For higher frequencies in the data being measured there should, of course, be a greater difference in the frequency of the signals generated by adjacent oscillators.

In addition to the difference between the primary frequencies of the various oscillators employed it is necessary that the frequencies be so selected that the harmonics generated by the various oscillators will not interfere with the signals generated by the remaining oscillators. To accomplish this result the frequencies of the various oscillators should not be divisible by a large common divisor. In addition, it has been found that the distortion is greater in the frequency region below 10 kilocycles than above this range. Accordingly, the lowest oscillator frequency might be selected as 15,833 cycles per second with the remaining oscillators having frequencies increasing in steps of 2500 cycles to 38,333 cycles per second for the last oscillator. However, it is not necessary that the frequency of these oscillators be critically and accurately adjusted at the frequencies selected, nor is it necessary to provide a frequency trimmer. Alignment of frequencies is preferably accomplished in the heterodyne oscillator circuits of the receiving equipment, as hereinbefore described. In the transmitting oscillators, it is merely necessary to maintain the frequencies constant within a small range, and to avoid having too small a frequency difference between adjacent transmitting oscillators. Thus, the frequency of each oscillator is preferably merely padded to within 100 cycles of the selected frequency.

The input to each measuring circuit 20 thus consists of a signal operating at a different frequency from that to any other measuring circuit. Each of these signals, known as a sub-carrier signal, is amplitude modulated by the data being measured. Each modulated signal, comprising the output of its measuring circuit 20, is then amplified by means of one of a set of five buffer amplifiers 70. The outputs of the five buffer amplifiers are connected in parallel, and the composite signal thus produced amplified by means of a master amplifier 90. The output of the latter is brought into a frequency modulation transmitter 130 of known type, where the composite signal frequency modulates a carrier frequency signal generated by the transmitter 130. The carrier signal operates in a range sufficiently wide to secure accurate reproduction of the sub-carrier signals at the receiving end. The frequency of the carrier signal may be any convenient value which is capable of accommodating this band width and which is commercially available for use.

Figure 2:
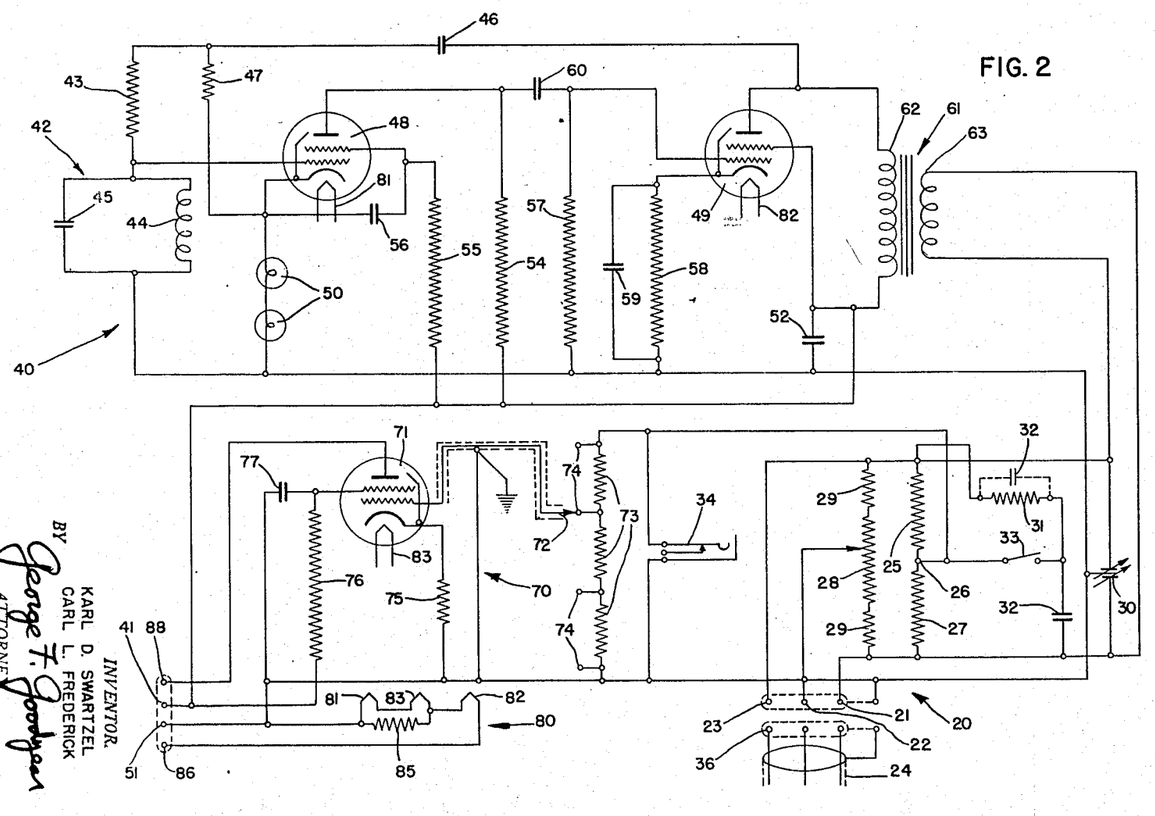
Figure 2 is a detailed wiring diagram of a typical channel employed on the transmitting end of the system shown in Figure 1, except for the active elements of the bridge circuit.

In Figure 2 there is shown a wiring diagram of a typical oscillator, measuring circuit and buffer amplifier employed in the general schematic arrangement, according to Figure 1. Since the measuring circuits 20 will transit information on the basis of amplitude, the signal level of each oscillator must be held to close limits of stability. The frequency of each oscillator signal must likewise be critically controlled to prevent impairment of dynamic response that would occur if the frequency shifted too far from the mid-point of the pass band of the individual crystal filters of the receiving equipment, as hereinafter described in detail. The oscillator 40 shown in Figure 2 is of the inductance-capacitance tuned type while the amplifier 70 contains only a single stage. The frequency of each oscillator is determined by means of the impedance values in a tuned circuit indicated generally at 42, comprising an inductor 44 and a fixed capacitor 45. The resistor 43 connected thereto is preferably a series-parallel combination of a highly negative temperature coefficient resistor and two positive temperature coefficient resistors so chosen as to give an over-all temperature coefficient which will supply compensation for temperature changes, as described in copending application Serial No. 569,612 to Leslie M. Harris, filed December 23, 1944, Patent 2,447,248, dated August 17, 1948. Since the output frequency of each oscillator is different from that of any of the remaining oscillators, the impedance values in circuit 42 are different for each one of the oscillators. Oscillation is obtained by means of positive feedback through a capacitor 46 and the resistor 43 from the plate of a type 6V6 beam-power tube 49 to the control grid of a type 6SJ7 pentode 48, with frequency determined by tuned circuit 42. Stability of level or amplitude is attained by means of two hot filament ballast lamps 50 coupled to the cathode of tube 48, the lamps 50 serving to control the amount of negative feedback from the plate of tube 49 through capacitor 46 and a resistor 47 to the cathode of tube 48. These ballast lamps are small 3 watt S6 Mazda lamps whose resistances vary directly with variations in current. The value of the resistance 47 in combination with the lamps 50 is such as to obtain a critical current passing through the ballast lamps. The value of this critical current is such that the filaments of the lamps 50 operate at a temperature where the variation of resistance with current is large. Any tendency to increase the current through the ballast lamps as a result of increased amplitude of output oscillation will thus tend to increase the resistance of lamps 50, increase the negative feedback, and thereby counteract the tendency of the output oscillation to increase in amplitude. Any tendency of the output oscillation to decrease in amplitude will have the opposite result.

All the circuit elements in the oscillator shown in Figure 2 are preferably identical for all five oscillators, except for elements 43, 44 and 45. A source of direct current, which may be a battery, direct current generator, or other controlled source of direct current, supplies current, preferably at 250 volts, to the oscillator through a positive terminal 41 and a negative terminal 51, the latter being grounded to the casing for the apparatus. Interference from outside sources is reduced to a minimum by means of a capacitor 52 connected across the terminals 41 and 51. The positive terminal 41 is connected through the plate feed resistor 54 to the plate of tube 48, and through a resistor 55 to the screen grid of tube 48. The cathode and screen grid of tube 48 are coupled to each other through a capacitor 56. The positive terminal 41 is also directly connected to the screen grid of tube 49. The negative terminal 51 is connected to tuned circuit 42, the cathode of tube 48 through ballast lamps 50, the control grid of tube 49 through resistor 57, and the cathode of tube 49 through the self-biasing resistor 58 and by-pass capacitor 59. The plate of tube 48 is coupled to the control grid of tube 49 through a capacitor 60.

The output of the oscillator is passed through the primary winding 62 of a balanced iron core output transformer 61. The primary of this transformer is connected at one end to the plate of tube 49 and at the other end to the positive terminal 41. The output of the oscillator is then taken off at the two terminals of the secondary 63 of transformer 61. The output voltage across the terminals of the secondary is approximately 4 volts, A. C. with the direct current voltage reduced to zero.

In the oscillators as described above, with properly chosen values of resistance and capacitance, the frequency is highly independent of changes in both plate and heater voltages and of changes in temperature. A variation in plate voltage from 240 volts to 260 volts causes a frequency shift of less than 2 cycles per second. A similarly small shift results from a change in heater voltage from 5.8 volts to 6.5 volts. The stability of level or amplitude is also satisfactory with respect to changes in plate and heater voltages over these ranges.

The effect of temperature on frequency is controlled by the compensation applied through careful selection of the temperature coefficient of capacitor 45. With respect to level, this is partially controlled by the ballast lamps 50 and the temperature compensating element of the resistor 43. It is also desired, however, to control the ambient temperature within narrow limits by means of a thermostatically controlled blower or other suitable means. The wave shapes, due to harmonic distortion, generated by the oscillators are closely sinusoidal, with not over 1.0% distortion for an output signal of 4 volts.

The output from the secondary winding 63 of transformer 61 constitutes the input of the measuring circuit 20. The measuring element or active resistance element in this circuit is one that measures quantities as a function of changes in electrical resistance, such as a resistance type strain gage, wherein the resistance varies as a result of change in dimensions due to expansion or contraction of the structural element to which it is attached. The active resistance element itself, indicated at 37 (Figure 3), is connected across two terminals 21 and 22 and constitutes one arm of a Wheatstone bridge. A second resistance element, indicated at 38, is incorporated for temperature compensating purposes and is connected across terminals 22 and 23, constituting the second arm of the Wheatstone bridge. If desired, the second arm of the bridge, and in fact also the third and fourth arms of the bridge, could be active measuring elements. In the form shown, however, the third and fourth arms of the bridge are composed of two approximately equal fixed resistors 27 and 25, connected together by means of a terminal 26. The resistive component of the bridge is balanced by means of two fixed resistors 29 in series with a potentiometer 28. The movable arm of the potentiometer 28 is connected to the terminal 22. Since the active resistance elements 37 for the various measuring circuits 20 are customarily positioned on widely separated parts of the airplane for the purpose of measuring structural strains, while the remainder of the apparatus is preferably located in the fuselage, lengthy wires are necessary to connect the strain gages to the terminals 21, 22 and 23. To prevent the introduction of stray currents, the three wires for the three connections to the active resistance element 37 and the temperature compensating resistor 38 are incorporated in a three-wire shielded cable 24. Connection between the cable 24 and the terminals 21, 22 and 23 is effected by means of a shielded plug, indicated schematically at 36.

Figure 4:
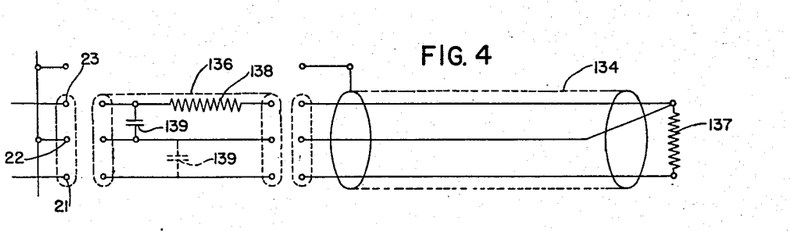
Figure 4 is an alternative wiring diagram for the active bridge elements.

In Figure 4 is shown an alternative arrangement for incorporating the active resistance element, here indicated as 137, into the circuit. In this form, a resistor 138 is not located adjacent the resistor 137, but is incorporated in a removable shielded plug 136 interposed between the terminals 21, 22 and 23 and the shielded cable 134. In this case, temperature compensation is incorporated into the design of the resistors 137 and 138 and the wires constituting the cable 134. A capacitor 139 is incorporated in the circuit, as shown, to allow for capacity effects between the two wires in cable 134 connected to terminals 21 and 22. Under some conditions, this capacitor may be installed in the dotted line positions.

Figure 3:
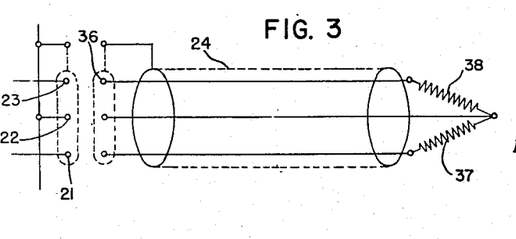
Figure 3 is a wiring diagram of the active elements of the bridge circuit employed in connection with the circuits shown in Figure 2.

The reactive component of the bridge is balanced by means of an adjustable capacitor 30. This capacitor has two separately adjustable plates connected, respectively, to the two input terminals. The central fixed plate is grounded and is also connected to terminal 22. The two output terminals of the bridge are connected, respectively, to terminals 22 and 26.

Since carrier signals do not indicate the difference between plus and minus bridge balance, and, therefore do not show whether an indicated strain is in tension or compression, it is necessary to set into the bridge a calibrated amount of unbalance or resistance bias. This is effected after bridge balance has been achieved, by adjustment of potentiometer 28 to a specified unbalance. The balance and unbalance of the bridge are both adjusted while reading the voltage by means of a high sensitivity voltmeter removably inserted in a jack 34 provided for that purpose. The amount of resistance bias should preferably be such that any possible change in resistance of element 37 or 137, as the case may be, due to applied load or strain, will not cause the bridge output at any instant to pass through the zero point. As a result, the direction of change in strain (e. g. compression or tension) can be easily determined, since change in one direction will result in an increase in bridge output, while change in the other direction will result in a decrease in bridge output. A bias is also desired to avoid distortion which may occur in the neighborhood of zero bridge output. If the applied load or strain can occur in only one direction (i. e. either compression or tension but not both), the bias may obviously be relatively small or even zero, thus enabling the greatest sensitivity to be achieved.

For the purpose of calibrating the entire system, a resistor 31 is shunted around the resistor 25 in the bridge 20. The push-button switch 33 is normally kept open, so that the resistor 31 is not normally actively connected in the circuit. The resistance of element 31 is selected to be equivalent to a predetermined change in resistance in element 37 or 137, or a predetermined load or strain. When the switch 33 is closed, the receiving equipment, as hereinafter described, will then give a reading which can be calibrated in terms of the applied load or strain, or change in resistance of the resistor 37 or 137. A capacitor 32 is also associated with the resistance 31 to clean up any associated shift in reactive balance of the bridge. This may be positioned in either the full line or the dotted line position shown in the drawing, depending in which direction the associated shift in reactive unbalance occurs. In the full line position the capacitor 32 is in parallel with the resistor 31, while in the dotted line position it is in series, and shunts the opposite arm 27.

The output of each measuring circuit 20 is brought into a separate buffer amplifier 70. These amplifiers function not only to amplify the signal from the bridge circuits, but also to prevent undesirable coupling from one measuring circuit to another. This is accomplished by arranging the effective output impedance of each buffer amplifier 70 so that it is considerably greater than the effective input impedance of the master amplifier 90. This output impedance need not be secured by an actual series resistor or equivalent physical element, but may be effected by negative feedback in the buffer amplifier, as hereinafter described. This arrangement assists in reducing harmonic distortion and in stabilizing the gain.

Each of these buffer amplifiers 70 contains a single 6SJ7 type pentode 71. The control grid of tube 71 is connected to the adjustable arm 72 of a rheostat comprising a number of resistors 73 in series with each other. The adjustable arm 72 can be caused to selectively contact any one of the terminals 74 connecting resistors 73 to each other. The terminals of the rheostat are connected across the output terminals of the measuring circuit 20 or the input terminals of the buffer amplifier 70, so that the rheostat thus acts as a voltage divider. By properly selecting the position of arm 72 according to the magnitude of the strain to be encountered in the strain gages, and the bias applied to the bridge as described above, and therefore the magnitude of the output of the measuring circuit 20, the voltage applied to the control grid of tube 71 at zero strain is the same for all measuring circuits, while the voltage under applied load or strain is within the same range for all measuring circuits. By this means the maximum resolution in all ranges is attained.

The cathode of tube 71 is connected to ground through a resistor 75, and it is through this resistor that negative feedback is accomplished. The plate supply voltage is fed from the positive terminal of the 250 volt direct current source to the terminal 88. The screen grid is connected to the positive terminal 41 through a resistor 76. A capacitor 77 connects the screen grid to ground.

Figure 5:
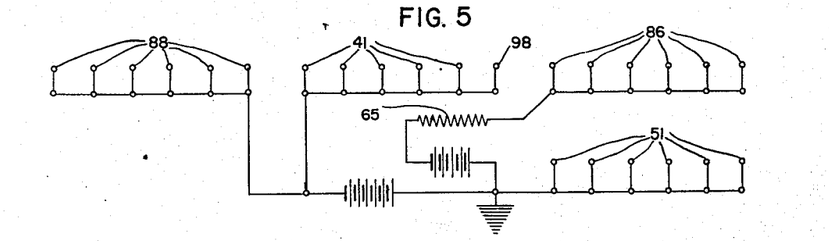
Figure 5 is a wiring diagram of the remaining elements of the transmitting end of the system which are common to all channels, except for the master amplifier and the transmitter proper.

The wiring diagram for the heaters of the three tubes 48, 49 and 71 is indicated generally at 80. The three heaters 81, 82 and 83 of the three tubes 48, 49 and 71, respectively, are connected in series. A by-pass resistor 85 shunting heaters 81 and 83 insures the same voltage drop across the heater of tube 49 (type 6V6) as across the heaters of tube 48 and 71 (type 6SJ7). The heaters are provided with a source of direct or alternating current at approximately 18 volts, which may be a battery or any other convenient source (see Figure 5) through the ground terminal 51 and a terminal 86. Where the direct current source is at 22 volts, as shown, a series resistor 65 may be incorporated to reduce the heater voltages.

All the above-described numbered elements, with the exception of the sources of current, are specific to each individual measuring circuit. With five measuring circuits there are five separate oscillators with their component parts and five separate buffer amplifiers with their component parts. The outputs of the five buffer amplifiers, however, are brought together in parallel and constitute the input of master amplifier 90 (see Figure 1). The five separate units, each consisting of a measuring circuit 20 (except for one unit which may omit the measuring circuit, for reasons as pointed out hereinafter), oscillator 40 and buffer amplifier 70, with their component and associated parts, may each be provided with a separate housing. The external controls necessary for such an arrangement are for the adjustable capacitor 30, the potentiometer 28, the push button switch 33 and the selector arm 72. The external connections necessary are provided through the shielded plug 36 connecting the strain gages proper with the unit, the terminals 41, 51, 86 and 88, and the jack 34 for connection to a vacuum tube voltmeter for accurately measuring the voltage. Each of the terminals 41, 51, 86 and 88 is electrically connected to the corresponding terminals of each of the remaining units.

Figure 6:
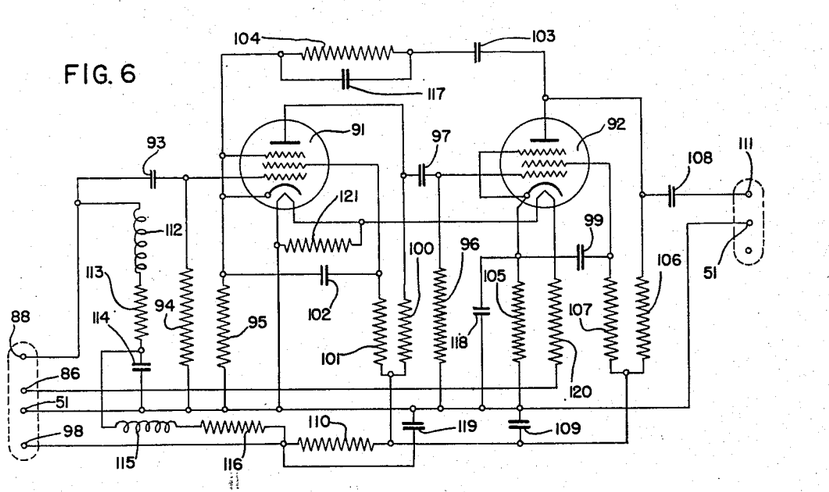
Figure 6 is a wiring diagram of the master amplifier used in the arrangement shown in Figure 1.

Referring now to Figure 6, the combined output of the five buffer amplifiers, from terminals 51 and 88, constitutes the input of master amplifier 90 (shown in Fig. 1). The latter is of the two stage resistance-capacitance coupled type, with a type 6SJ7 pentode 91 in the first stage and a type 6AG7 pentode 92 in the second stage. The resistance-capacitance coupling from the input to the tube 91 consists of a capacitor 93 and a resistor 94 coupled to the control grid of tube 91. On the input side of the capacitor 93 there is connected an inductor 112 and a resistor 113 in series, serving to flatten out the response of the circuit, necessitated by the relatively large capacity of the extensive wiring employed. A filter circuit including a capacitor 114, an inductor 115, and a resistor 116 is incorporated between the resistor 113 and ground 51 and the positive input terminal 98 connected to a source of direct current at 250 volts. The cathode of tube 91 is connected to ground through a resistor 95. The coupling between tubes 91 and 92 is effected by means of a capacitor 97. A resistor 96 connects the control grid of tube 92 to ground. The positive terminal 98 is connected to the plate of tube 91 through a plate feed resistor 100 and a combination resistor 110 to the screen grid of tube 91 through a resistor 101. The screen grid and cathode of tube 91 are coupled through a capacitor 102. Inverse feedback from the plate of tube 92 to the cathode of tube 91 is effected through a capacitor 103, a resistor 104 and a capacitor 117 in parallel therewith.

The cathode of tube 92 is connected to ground through a resistor 105 and a capacitor 118 in parallel therewith. The positive terminal 98 is connected to the plate of tube 92 through a plate feed resistor 106 and combination resistor 110 and to the screen grid of tube 92 through a resistor 107 and combination resistor 110. A by-pass condenser 109 is provided between ground and the common terminal of resistors 106 and 107. The screen grid and cathode of tube 92 are coupled through a capacitor 99. The output of the master amplifier at terminal 111 is resistance-capacitance coupled to the tube 92 through the capacitor 108 and the plate feed resistor 106. A by-pass capacitor 119 across the terminals 51 and 88 reduces interference from outside sources.

The heaters of tubes 91 and 92 are supplied with suitable current through terminals 86 and 51, with suitable resistors 120 and 121 provided to secure the proper voltage drop across the heaters.

The master amplifier 90 is used to raise the level of the composite signal, which consists of a number of modulated signals from all buffer amplifiers, to a value suitable for the circuits of the frequency modulation transmitter 130 (Figure 1). Through the use of negative feedback, the gain of this amplifier is made quite stable in the presence of minor changes in heater and plate voltages. Negative feedback is also responsible for a low harmonic distortion, of the order of 0.2% with 0.01 volts in the input. The frequency modulation transmitter 130 is connected to the master amplifier 90 through terminals 51 and 111. Such transmitter is of any suitable known type. It transmits a carrier signal, frequency modulated by the amplified signals from the five buffer amplifiers. For improved stability at high altitudes, the crystal in the frequency modulation transmitter may be enclosed in a thermostatically controlled oven.

The transmission equipment as above described is suitable for installation in an aircraft undergoing flight tests. Information which may be transmitted is that collected from the measuring circuit 20, and may include: strains occurring in structural members, measured by means of resistance type strain gages, and varying at high frequencies; air pressures occurring at various surfaces and varying at high frequencies; and other quantities varying at high frequencies. It may also be used for the transmission of quantities varying at low frequencies, or subject to irregular variations.

Referring again to Figure 1, the signal transmitted by the frequency modulation transmitter 130 is received by the frequency modulation receiver 200. The composite signal to be analyzed, received by the receiver 200, consists of a radio frequency carrier signal frequency modulated by a plurality of sub-carrier signals, the latter being generated and amplitude modulated in the sub-carrier transmitter circuits. This composite signal is distributed to five analyzing channels, where it is fed into five modulators 230, one for each sub-carrier. Each modulator 230 receives a locally generated oscillator frequency from an oscillator 240, such that the difference between this local frequency and one of the sub-carrier frequencies lies directly in the center of the pass band of a crystal band pass filter 260. There are, therefore, five crystal filters, the amplitudes of whose output signals represent respectively the amplitudes of the five sub-carriers, or the information collected from the measuring circuits. The output signal from each crystal filter 260 is amplified by a channel amplifier 270, one for each channel. The amplified output signal is then rectified by means of a channel rectifier 290, one for each channel, and passed through a low pass filter 210, one for each channel, to remove the sub-carrier frequency. Finally, a stable direct current counter-bias is applied to each signal as indicated at 220, to compensate for the bias imposed in the measuring circuit 20, as previously described. The five corrected, demodulated and amplified signals are then sent to a multi-channel recording galvanometer or oscillographic camera 295, where a time history of strains and other information collected by the measuring circuits 20 is recorded.

In the system as above described, one of the sub-carrier channels is preferably transmitted without modulation by a measuring circuit. By this means, the quality of performance of the whole system can be detected at a glance. Alternatively, this unmodulated channel, conveniently called a "pilot" channel, may be used to control and compensate for changes in volume of the signal received by the receiver 200, such as by means of automatic volume control or "A. V. C." This channel, furthermore, may be utilized to receive and record time impulses for synchronization with other equipment.

Figure 7:
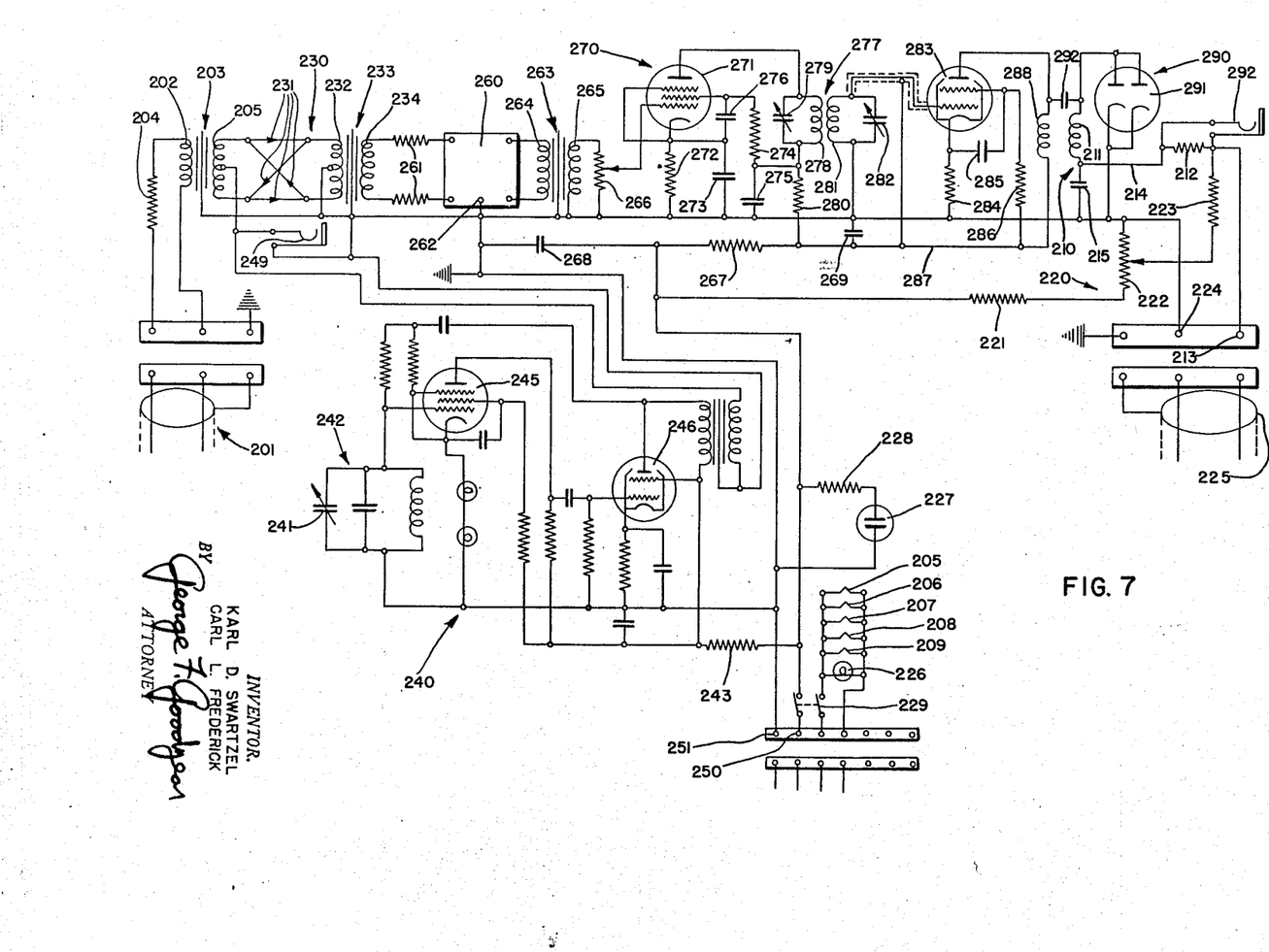
Figure 7 is a detailed wiring diagram of a typical channel employed on the receiving end of the system shown in Figure 1.

In Figure 7 is illustrated a detailed wiring diagram of a typical analyzing channel. The output from the frequency modulation receiver 200 is brought through a two-wire shielded cable 201 to the primary 202 of an iron-core transformer 203. A resistor 204 in series with the primary 202 is employed to furnish the correct matching impedance for the modulator 230, and to isolate each channel against distortion products generated in adjacent modulating circuits, the presence of which might lead to errors in the galvanometer deflections. The degree of isolation is closely expressed by the relation $$A = \frac{Ro}{R + Ro}$$

where A is the attenuation factor, Ro is the internal impedance of the output circuit of the receiver 200, and R is the value of resistance 204. With Ro of the order of 1 ohm and R of the order of 600 ohms, the attenuation factor is over 56 decibels, so that the isolation is adequate.

The current for the modulator 230 is taken off the secondary 205 of the transformer 203 and passed through four copper oxide modulator elements 231 arranged in a lattice structure as shown. This current is modulated by the output from the oscillator 240, connected across the midpoint of the secondary 205 of transformer 203 and the midpoint of the primary 232 of an output transformer 233. Because of the particular lattice structure of the copper oxide modulator elements 231 and by means of proper balance thereof, and because the signal from the oscillator 240 is made relatively strong as compared with the signal from the receiver 200 (the difference in signal level preferably being at least 10 decibels), it can be shown that the strongest signals appearing in the modulator output will have frequencies satisfying the formula $$(2m-1)P \pm Q$$

where $m$ is any positive or negative integer, P is the oscillator frequency of any oscillator 240 and Q is the frequency of any oscillator 40 (see Figure 1), while frequencies equal to $mP + nQ$, where $n$ is any positive or negative integer other than plus or minus 1 are relatively weak or suppressed. This insures that the only frequency in the range of the pass-band of a crystal filter 260 appearing at a discernible level will be equal to P−Q, thus securing a heterodyne frequency shift.

The circuit for the oscillator is indicated generally at 240, this circuit being generally similar to that of the oscillators 40 (see Figure 2) used in the transmitting equipment. The only important differences are the provision of a variable capacitor 241 in the tuned circuit 242 (corresponding to the tuned circuit 42), and the provision of a resistor 243 in the circuit connecting the oscillator with the positive terminal 250 of a 250 volt direct current power supply. The negative terminal 251 of this power supply is connected to ground. The adjustable capacitor 241 is employed for the purpose of critically aligning the frequency output of the modulator 230 so that the modulated sub-carrier signal lies as closely as possible in the center of the pass band of filter 260. Due to the provision of capacitor 241 in oscillator 240, it is not necessary to critically align the frequencies of oscillators 40. Other than the capacitor 241 and the resistor 243, the circuits for oscillators 40 and 240 are substantially the same, except that the numerical values of the resistances and capacitances are somewhat different and except that the heaters for the two tubes 245 and 246 are connected to a 6 volt current source instead of an 18 volt current source and are therefore connected in parallel instead of in series. As in the case of the oscillators 40, the frequencies of the oscillators 240 vary for the different channels.

The channel frequency assignments are preferably such that the values of $Pm-Qm$, $Pn-Qn$, $Po-Qo$, $Pp-Qp$ and $Pq-Qq$ are the same, where P is the oscillator frequency of a particular oscillator 240, Q is the oscillator frequency of the corresponding oscillator 40, and the subscripts $m$, $n$, $o$, $p$ and $q$ refer to the five channels. By this expedient, the crystal filters 260 may all be identical for all channels, and each will pass only a narrow band of frequencies, e. g. corresponding to $Pm-Qm$ but will not pass any other frequencies such as $Pm-Qn$, $Pq-Qo$ or $Pn+Qp$, etc. For example, let us suppose that the frequencies $Qm$, $Qn$, $Qo$, $Qp$ and $Qq$ are 15,833, 18,333, 20,833, 23,333 and 25,833 cycles per second, respectively. The frequencies $Pm$, $Pn$, $Po$, $Pp$ and $Pq$ may then be 107,833; 110,333, 112,833, 115,333 and 117,833 cycles per second, respectively. The values of $Pm-Qm$, $Pn-Qn$, $Po-Qo$, $Pp-Qp$ and $Pq-Qq$ will then all be 92,000 cycles per second. At the same time, no other combination of P's and Q's will have the same value, i. e., 92 kilocycles per second (for example, $Pp-Qm$ equals 99,500 cycles per second). It will thus be seen that, if the pass bands of the crystal filters 260 are all 92 kilocycles, only a single modulated oscillator signal (from the oscillators 40) will pass through each crystal filter. Other frequencies may be more suitable than those illustrated above from the standpoint of placing of second or third or higher order cross-modulation products outside the pass band of the crystal filters in the receiving channels. These cross products will tend to appear if the radio link is not sufficiently linear in its ability to faithfully transmit signals.

The voltage across the oscillator terminals may be measured by means of a voltmeter inserted in a jack 249.

The secondary 234 of transformer 233 is connected, through resistors 261, provided to control impedance, to a band-pass filter 260 of the quartz crystal type. The case enclosing this filter is grounded, as indicated at 262. The output of the filter 260 is led through the primary 264 of a transformer 263, the secondary 265 of this transformer constituting the input of a channel amplifier indicated generally at 270. The secondary 265 is grounded at one terminal and is provided with a potentiometer 266 shunted across its terminal. This potentiometer must be chosen to secure favorable impedance to insure proper performance of the filter 260. The adjustable arm of this potentiometer is connected to the control grid of a type 6SJ7 pentode 271. The cathode of pentode 271 is connected to ground through a resistor 272 and a by-pass capacitor 273. A plate feed wire 287 is connected to positive terminal 250 through a resistor 267 and is connected to ground through by-pass capacitor 269. The screen grid of tube 271 is connected to wire 287 through a pair of resistors 274 and 280 in series, and the common connection of these two resistors is connected to ground through a by-pass capacitor 275. The screen grid is also connected to the cathode through a capacitor 276. The connection between resistors 274 and 280 is also connected to the primary 278 of a transformer 277 adjustably tuned by means of an adjustable capacitor 279. The purpose of the tuned transformer 277 is to suppress undesirable noise and disturbance. The opposite terminal of primary 278 is connected to the plate of tube 271. The secondary 281 of transformer 277, also adjustably tuned by means of an adjustable capacitor 282, is connected at one terminal to ground and at the opposite terminal through a lead-shielded cable to the control grid of a type 6V6 pentode 283. The cathode of pentode 283 is connected to ground through a resistor 284, and to the screen grid through a capacitor 285. The screen grid is also connected, through a resistor 286, to the plate feed wire 287, which connects resistors 280 and 267. Plate feed wire 287 is also connected through an inductance coil 288 to the plate of tube 283. A capacitor 268 is also provided to assist in suppressing interference by stray currents.

By the use of a quartz crystal type filter 260 instead of the inductance-capacitance type, and with proper selection of the values of resistors 261 and 266, the response in the pass-band of the filter can easily be made entirely flat. Furthermore, the crystals for all the channels can be made exactly the same, eliminating the necessity for separately designing filters for each channel.

The rectifier 290 consists of a type 6H6 twin diode 291 whose plates are connected to the plate of tube 283 through a capacitor 292. The plates of tube 291 are also connected through a coil 211, wire 214 and a resistor 212 to the positive output terminal 213. Wire 214 is also connected to ground through a capacitor 215, the coil 211 and capacitor 215 together constituting a low pass filter, indicated generally at 210, to remove the carrier frequency from the signal. A jack 292 may be provided for connecting a meter to measure the voltage drop across resistor 212.

A counterbiasing voltage is applied to the output signal in order to compensate for the bias introduced into the transmitted signal as discussed previously. This is accomplished by means of a resistor 221 connected to the terminal 250 and to one terminal of a potentiometer 222, the voltage dividing arm of this potentiometer being connected to the positive output terminal 213 through a resistor 223. The opposite terminal of potentiometer 222 is connected to ground and to the negative output terminal 224.

The output of each channel, through the terminals 213 and 224 and a shielded cable 225, is fed into a corresponding channel of any suitable type of multi-channel recording galvanometer 295 (Figure 1), or may be measured or recorded in any other convenient way. The recording instrument 295, for example, may make five visual indications or recordings simultaneously, one for each of the five channels shown.

The heaters for tubes 245, 246, 271, 283 and 291 are indicated diagrammatically at 205, 206, 207, 208 and 209 respectively. These are supplied with a suitable source of current at 6 volts, as indicated, the circuit being provided with a pilot light 226. A 40 milliwat neon lamp 227 in series with a resistor 228 is connected across the 250 volt direct current power supply and acts as a pilot light therefor. The 6 volt and 250 volt power supply circuits may both be closed, when the system is to be operated, by means of double throw switch 229.

Although the above description has been with reference to a frequency modulation type of transmitter and receiver, the invention may also be equally well practiced with an amplitude or phase modulation type of transmitter and receiver. Again, the invention has been described with reference to strain gages in a Wheatstone bridge circuit as the active measuring elements, but it may equally be used with a reluctance type pick-off or any other amplitude modulating device of suitable character. Furthermore, visual indicating meters may be employed instead or in combination with a recording galvanometer or oscillograph. Many other changes may be made without departing from the spirit of the invention, except as defined by the appended claims.

We claim:

1. Apparatus for transmitting, receiving and recording a plurality of measurements by means of radio waves: comprising a plurality of transmitting oscillators transmitting sub-carrier signals at a plurality of different frequencies each exceeding ten kilocycles per second; a plurality of bridge circuits; connecting means for modulating the output signal from each of said oscillators with the output of a said bridge circuit; a radio frequency transmitter having an output signal modulated by the output of all of said transmitting oscillators; a radio frequency receiver; a plurality of receiving channels fed by said receiver, each channel including a receiving oscillator arranged to modulate the channel signal and a band pass wave filter, the frequencies satisfying the formula: $mP+nQ=F$, where P and Q are the frequencies of a said transmitting oscillator and said receiving oscillator, F is the frequency of the pass band of said wave filter, and $m$ and $n$ are any positive or negative integers; each channel also including an amplifier and a rectifier; and means for recording the residual signals from each channel.

2. Apparatus for transmitting, receiving, and recording a plurality of measurements by means of radio waves: comprising a plurality of transmitting oscillators transmitting sub-carrier signals at a plurality of different frequencies; a plurality of bridge circuits; connecting means for modulating the output signal from each of said oscillators with the output of a said bridge circuit; a radio frequency transmitter having an output signal modulated by the output of all of said transmitting oscillators; a radio frequency receiver; a plurality of receiving channels fed by said receiver, each channel including a receiving oscillator arranged to modulate the channel signal and a band pass wave filter, the frequencies satisfying the formula: $P-Q=F$, where P and Q are the frequencies of a said transmitting oscillator and said receiving oscillator, and F is the frequency of the pass band of said wave filter; each channel also including an amplifier and a rectifier; and means for recording the residual signals from each channel.

3. Apparatus according to claim 2, characterized in that each said P is different from the P for any other channel, each said Q is different from the Q for any other channel, and the F's for all channels are the same.

4. Apparatus for transmitting, receiving and recording a plurality of measurements by means of radio waves: comprising a plurality of transmitting oscillators transmitting sub-carrier signals at a plurality of different frequencies; a plurality of bridge circuits; means for applying a bias to an arm of each said bridge circuits; connecting means for modulating the output signal from each of said oscillators with the output of a said bridge circuit; a radio frequency transmitter having an output signal modulated by the output of all of said transmitting oscillators; a radio frequency receiver; a plurality of receiving channels fed by said receiver, each channel including a receiving oscillator arranged to modulate the channel signal and a band pass wave filter, the frequencies satisfying the formula: $P-Q=F$, where P and Q are the frequencies of a said transmitting oscillator and said receiving oscillator, and F is the frequency of the pass band of said wave filter; each channel also including an amplifier, a low pass wave filter arranged to remove the F frequency, and a rectifier; and means for recording the residual signals from each channel.

5. Apparatus according to claim 4, characterized in that each said P is different from the P for any other channel, each said Q is different from the Q for any other channel, and the F's for all channels are the same.

6. Apparatus for transmitting, receiving and recording a plurality of measurements by means of radio waves, comprising a plurality of transmitting oscillators transmitting sub-carrier signals at a plurality of different frequencies, a plurality of bridge circuits each having an arm whose resistance varies with variation in the quantity to be measured, a predetermined bias applied to the output of each said bridge circuit, means for modulating the output signal from each of said oscillators with the biased output of a said bridge, a radio frequency transmitter having an output signal modulated by the output of all of said transmitting oscillators, a radio frequency receiver, a plurality of receiving channels fed by said receiver, each channel including a receiving oscillator for modulating the channel signal with a frequency different from that of the receiving oscillator of each other channel and such as to bring the signals in all of said channels to substantially the same frequency range, a band pass wave filter for removing the carrier frequency and the sub-carrier frequencies of the remaining channels, an amplifier and a rectifier in each said channel, a predetermined counter bias applied to the output of said rectifier, and means for recording the residual signals from each channel.

7. Apparatus for transmitting, receiving and recording a plurality of measurements by means of radio waves: comprising a plurality of transmitting oscillators transmitting sub-carrier signals at a plurality of different frequencies; a plurality of bridge circuits; connecting means for modulating the output signal from each of said oscillators with the output of a said bridge circuit; a plurality of buffer amplifiers one each for separately amplifying each modulated oscillator output signal, a master amplifier arranged to amplify the combined output of all said buffer amplifiers, a radio frequency transmitter having an output signal modulated by the output of said master amplifier, a radio frequency receiver; a plurality of receiving channels fed by said receiver, each channel including a receiving oscillator arranged to modulate the channel signal with a frequency different from that of the receiving oscillator of each other channel and such as to bring the signals in all of said channels to substantially the same frequency range, a band pass wave filter arranged to remove the carrier signal of said transmitter and the modulated transmitting oscillator signal of all other channels, an amplifier, a low pass wave filter arranged to remove the frequency containing the associated receiving oscillator frequency as a component, and a rectifier; and means for recording the residual signals from each channel.

8. Apparatus for transmitting, receiving and recording a plurality of measurements by means of radio waves: comprising a plurality of transmitting oscillators transmitting sub-carrier signals at a plurality of different frequencies; a plurality of bridge circuits; connecting means for modulating the output signal from each of said oscillators with the output of a said bridge circuit; a plurality of buffer amplifiers one each for separately amplifying each modulated oscillator output signal while suppressing below a perceptible level feedback from any other amplified modulated oscillator output circuit, a master amplifier arranged to amplify the combined output of all said buffer amplifiers, a radio frequency transmitter having an output signal modulated by the output of said master amplifier, a radio frequency receiver; a plurality of receiving channels fed by said receiver, each channel including a receiving oscillator arranged to modulate with the channel signal with a frequency different from that of the receiving oscillator of each other channel and such as to bring the signals in all of said channels to substantially the same frequency range, a pass band wave filter arranged to remove the carrier signal of said transmitter and the modulated transmitting oscillator signal of all other channels, an amplifier, a low pass wave filter arranged to remove the frequency containing the associated receiving oscillator frequency as a component, and a rectifier; and means for recording the residual signals from each channel.

KARL D. SWARTZEL.
CARL L. FREDERICK.

REFERENCES CITED

The following references are of record in the file of this patent:

UNITED STATES PATENTS

| Number | Name | Date |
|---|---|---|
| 1,633,100 | Heising | June 21, 1927 |
| 1,877,467 | Lake | Sept. 13, 1932 |
| 2,008,832 | Leonard, Jr. | July 23, 1935 |
| 2,108,088 | Tufts | Feb. 15, 1938 |
| 2,378,395 | Dickson | June 19, 1945 |
| 2,389,356 | Goldstein | Nov. 20, 1945 |

OTHER REFERENCES

Published article, "Radio flight-test recorder," pages 174–177 "Aircraft Engineering," June, 1943.